(12) United States Patent
Konishi et al.

(10) Patent No.: US 9,908,434 B2
(45) Date of Patent: Mar. 6, 2018

(54) DRIVING DEVICE

(71) Applicant: HONDA MOTOR CO., LTD., Tokyo (JP)

(72) Inventors: Yoshiaki Konishi, Wako (JP); Yusuke Sakaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/472,464

(22) Filed: Mar. 29, 2017

(65) Prior Publication Data

US 2017/0282752 A1   Oct. 5, 2017

(30) Foreign Application Priority Data

Mar. 30, 2016  (JP) ................. 2016-067854

(51) Int. Cl.

| | |
|---|---|
| *B60L 15/20* | (2006.01) |
| *B60K 1/02* | (2006.01) |
| *B60K 6/46* | (2007.10) |
| *B60K 31/02* | (2006.01) |
| *B60K 1/00* | (2006.01) |

(52) U.S. Cl.
CPC ............ *B60L 15/2054* (2013.01); *B60K 1/02* (2013.01); *B60K 6/46* (2013.01); *B60K 31/02* (2013.01); *B60K 2001/006* (2013.01); *Y02T 10/7258* (2013.01)

(58) Field of Classification Search
CPC ...... B60L 15/10; B60L 15/20; B60L 15/2054; B60K 1/00; B60K 1/02; B60K 6/20; B60K 6/46; B60K 2031/0091; B60K 7/0007; B60K 11/02
See application file for complete search history.

(56) References Cited

U.S. PATENT DOCUMENTS

2012/0023918 A1*  2/2012  Laird ................. B60K 6/12
                                                           60/327
2013/0152570 A1*  6/2013  Hoshinoya ............. B60K 6/387
                                                           60/396

(Continued)

FOREIGN PATENT DOCUMENTS

JP         2012-214176 A    11/2012

*Primary Examiner* — Erez Gurari
(74) *Attorney, Agent, or Firm* — Westerman, Hattori, Daniels & Adrian, LLP

(57) ABSTRACT

A rear wheel driving device includes first and second electric motors, a wet multi-plate type hydraulic brake provided on motive power transmission paths between the first and second electric motors and rear wheels Wr and causing the drive source side and the wheel side to become disconnected state or connected state by being released or fastened, and a control device that controls switching between the disconnected state and the connected state of the hydraulic brake and controls a vehicle speed. The rear wheel driving device further includes a viscosity acquisition unit that acquires a viscosity correlation amount of oil provided to cool plates of the wet multi-plate type hydraulic brake, and the control device fastens the hydraulic brake or maintains fastening thereof and controls the vehicle speed to lower than a first speed in a case where the viscosity correlation amount is a first prescribed value or higher.

5 Claims, 13 Drawing Sheets

(56) References Cited

U.S. PATENT DOCUMENTS

| | | | | |
|---|---|---|---|---|
| 2013/0342150 A1* | 12/2013 | Ozaki | ............... | B60L 3/0061 |
| | | | | 318/490 |
| 2014/0097043 A1* | 4/2014 | Hoshinoya | ......... | F16H 57/0405 |
| | | | | 184/6.4 |
| 2014/0195082 A1* | 7/2014 | Takamura | ............ | B60L 11/14 |
| | | | | 701/22 |
| 2015/0367832 A1* | 12/2015 | Oshiumi | ............ | B60K 6/445 |
| | | | | 701/22 |
| 2016/0207396 A1* | 7/2016 | Pritchard | ............ | B60K 17/02 |
| 2016/0244050 A1* | 8/2016 | Ouchi | ............ | B60K 6/48 |
| 2017/0175612 A1* | 6/2017 | Tokozakura | ............ | F01P 3/18 |
| 2017/0197503 A1* | 7/2017 | Yukishima | ............ | B60K 7/0007 |
| 2017/0259824 A1* | 9/2017 | Kim | ............ | B60W 30/18009 |
| 2017/0282752 A1* | 10/2017 | Konishi | ............ | B60L 15/2054 |

* cited by examiner

FIG. 4

| VEHICLE STATE | FRONT UNIT | REAR UNIT | REAR MOTORS | OWC | BRK |
|---|---|---|---|---|---|
| VEHICLE STANDING STILL | × | × | STOP | OFF | OFF |
| FORWARD TRAVEL AT LOW VEHICLE SPEED | × | ○ | POWERING DRIVING | ON | ON (WEAKLY FASTENED) |
| FORWARD TRAVEL AT INTERMEDIATE VEHICLE SPEED | ○ | × | STOP | OFF | ON (WEAKLY FASTENED) |
| DECELERATION REGENERATION | ○ | ○ | REGENERATIVE DRIVING | OFF | ON |
| ACCELERATION | ○ | ○ | POWERING DRIVING | ON | ON (WEAKLY FASTENED) |
| FORWARD TRAVEL AT HIGH VEHICLE SPEED | ○ | × | STOP | OFF | OFF |
| REVERSE TRAVEL | × | ○ | REVERSE POWERING DRIVING | OFF | ON |

DRIVING DEVICE

CROSS REFERENCES TO RELATED APPLICATIONS

The present application claims priority under 35 U.S.C. § 119 to Japanese Patent Application No. 2016-067854, filed Mar. 30, 2016, entitled "Driving Device." The contents of this application are incorporated herein by reference in their entirety.

BACKGROUND

1. Field

The present disclosure relates to a driving device in which a connecting-disconnecting unit is provided on a motive power transmission path between drive sources and driven portions.

2. Description of the Related Art

Japanese Unexamined Patent Application Publication No. 2012-214176 discloses a driving device for a vehicle, the driving device including a left wheel driving device that has a first electric motor which drives a left wheel of the vehicle and a first planetary gear type transmission apparatus which is provided on a motive power transmission path between the first electric motor and the left wheel and a right wheel driving device that has a second electric motor which drives a right wheel of the vehicle and a second planetary gear type transmission apparatus which is provided on a motive power transmission path between the second electric motor and the right wheel. In the first and second planetary gear type transmission apparatuses, the first and second electric motors are connected with respective sun gears, the left wheel and the right wheel are connected with respective planetary carriers, and ring gears are connected with each other. Further, the connected ring gears are provided with a brake unit that brakes rotation of the ring gears by releasing or fastening the ring gears and a one-way clutch that becomes an engaged state in a case where rotational motive power in one direction on the electric motor side is input to the wheel side, becomes a non-engaged state in a case where the rotational motive power in the other direction on the electric motor side is input to the wheel side, becomes the non-engaged state in a case where the rotational motive power in one direction on the wheel side is input to the electric motor side, and becomes the engaged state in a case where the rotational motive power in the other direction on the wheel side is input to the electric motor side.

Japanese Unexamined Patent Application Publication No. 2012-214176 discloses that in the driving device for a vehicle, the brake unit is fastened such that the electric motor and the wheel become a connected state in a case where the rotational motive power in the one direction on the electric motor side is input to the wheel side, and the fastened brake unit is released in order to inhibit overspeed of the electric motor in a case where a vehicle speed becomes a prescribed vehicle speed or higher while the electric motor and the wheel are in the connected state.

SUMMARY

Incidentally, in the driving device for a vehicle, which is disclosed in Japanese Unexamined Patent Application Publication No. 2012-214176, a portion of the brake unit is positioned in an oil accumulation unit in which oil is accumulated in a lower portion of a case. Thus, a mixing resistance force of the oil becomes large when viscosity of the oil becomes high, such as when a temperature is low, and vehicle behavior may become unstable because a torque is transmitted to the wheel even if the brake unit is released.

Further, there is a demand that the brake unit is fastened as much as possible because in the driving device for a vehicle, a response in regenerative driving of the electric motor is improved in a case where the brake unit is fastened such that the electric motor and the wheel become the connected state.

It is desirable to provide a driving device that is capable of securing a fastened state of a connecting-disconnecting unit as long as possible and is capable of suppressing instability of vehicle behavior.

According to a first aspect, the present disclosure provides a driving device (a rear wheel driving device 1 of an embodiment described later, for example) including: a drive source (a first electric motor 2A and a second electric motor 2B of the embodiment described later, for example) that generates a driving force of a vehicle (a vehicle 3 of the embodiment described later, for example); a wet multi-plate type connecting-disconnecting unit (a hydraulic brake 60 of the embodiment described later, for example) that has a multi-plate portion and is provided on a motive power transmission path between the drive source and a wheel (a rear wheel Wr of the embodiment described later, for example) of the vehicle and causes the drive source and the wheel to become a disconnected state by releasing multi plates of the multi-plate portion from one another or to become a connected state by fastening the multi plates, i.e., contacting the plates one another; a connecting-disconnecting unit control device (a control device 8 of the embodiment described later, for example) that controls switching between the disconnected state and the connected state of the connecting-disconnecting unit; and a vehicle speed control device (a control device 8 of the embodiment described later, for example) that controls a speed of the vehicle, in which the driving device further includes a viscosity acquisition unit (a viscosity sensor and a temperature sensor of the embodiment described later, for example) that acquires a viscosity correlation amount of a liquid fluid (oil of the embodiment described later, for example) which is provided to cool the multi-plate portion (fixed plates 35 and rotating plates 36 of the embodiment described later, for example) of the wet multi-plate type connecting-disconnecting unit, and in a case where the viscosity correlation amount is a first predetermined value or higher, the connecting-disconnecting unit control device fastens the connecting-disconnecting unit or maintains fastening of the connecting-disconnecting unit, and the vehicle speed control device controls the speed of the vehicle to lower than a first speed.

In the first aspect, the mixing resistance force due to the liquid fluid becomes large in a case where the viscosity correlation amount is the first predetermined value or higher. Thus, even if the connecting-disconnecting unit is released, an unnecessary torque is transmitted to the wheel, and behavior of the vehicle may become unstable. Accordingly, the vehicle speed is restricted while the connecting-disconnecting unit is kept fastened, and instability of the vehicle behavior may thereby be suppressed. Further, in a case where the viscosity correlation amount is lower than the first predetermined value, the connecting-disconnecting unit may be kept fastened.

Further, according to a second aspect of the present disclosure, in the driving device according to the first aspect, in a case where the viscosity correlation amount is lower than the first predetermined value, the connecting-disconnecting unit control device may release the connecting-disconnecting unit in a case where the speed of the vehicle is a second speed or higher that is higher than the first speed.

In the second aspect, an influence on the vehicle behavior due to unnecessary torque transmission to the wheel is small. However, in a case where the viscosity correlation amount is comparatively high, the connecting-disconnecting unit is released at the second speed that is higher than the first speed, and the connecting-disconnecting unit may thereby be kept fastened to the second speed that is higher than the first speed. Further, overspeed of the drive source may be restrained by releasing the connecting-disconnecting unit at the second speed or higher.

Further, according to a third aspect of the present disclosure, in the driving device according to the second aspect, the drive source may be an electric motor, the driving device may further include an electric power control unit (an inverter of the embodiment described later, for example) that controls electric power of the electric motor and a temperature acquisition unit (a temperature sensor of the embodiment described later, for example) that acquires a temperature of the electric power control unit, and in a case where the viscosity correlation amount is lower than the first predetermined value and the temperature is lower than a predetermined temperature, the vehicle speed control device may release the connecting-disconnecting unit at a third speed or higher that is higher than the first speed and lower than the second speed.

In the third aspect, in a case where the viscosity correlation amount is lower than the first predetermined value and the temperature of the electric power control unit is lower than the temperature, the connecting-disconnecting unit is released at the third speed or higher that is higher than the first speed and lower than the second speed. Accordingly, the connecting-disconnecting unit may be kept fastened to the third speed while the electric power control unit is protected.

Further, according to a fourth aspect of the present disclosure, in the driving device according to the third aspect, in a case where the viscosity correlation amount is lower than the first predetermined value and equal to or higher than a second predetermined value that is lower than the first predetermined value and the temperature is lower than the predetermined temperature, the vehicle speed control device may release the connecting-disconnecting unit at the third speed or higher.

In the fourth aspect, in a region in which the viscosity correlation amount is lower than the second predetermined value, the connecting-disconnecting unit may be kept fastened to the second speed that exceeds the third speed.

Further, according to a fifth aspect of the present disclosure, in the driving device according to the fourth aspect, the first predetermined value may be a fixed value, and the predetermined temperature and the second predetermined value may be variation values and may be set such that the second predetermined value becomes higher as the predetermined temperature becomes higher.

In the fifth aspect, while an influence on the vehicle behavior is certainly suppressed by setting the first predetermined value as the fixed value, the predetermined temperature and the second predetermined value are the variation values and are set such that the second predetermined value becomes higher as the predetermined temperature becomes higher. Accordingly, the region in which the connecting-disconnecting unit may be kept fastened to the second speed that exceeds the third speed may be expanded.

The word "unit" used in this application may mean a physical part or component of computer hardware or any device including a controller, a processor, a memory, etc., which is particularly configured to perform functions and steps disclosed in the application.

BRIEF DESCRIPTION OF THE DRAWINGS

FIG. 4 is a table that illustrates the relationships between a front wheel driving device and the rear wheel driving device in accordance with vehicle states together with action states of electric motors.

DESCRIPTION OF THE PREFERRED EMBODIMENTS

One embodiment of a driving device according to the present disclosure will first be described with reference to FIGS. 1 to 3.

Figure 1:
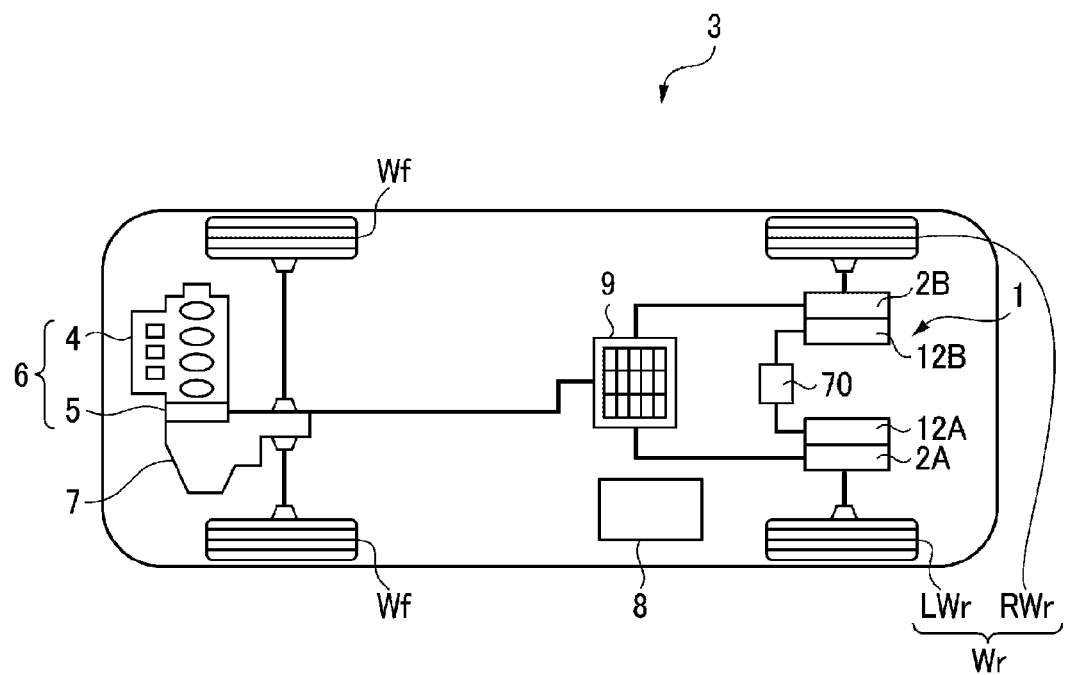
FIG. 1 is a block diagram that illustrates a schematic configuration of a hybrid vehicle as one embodiment of a vehicle in which a driving device according to the present disclosure may be installed.

The driving device of this embodiment uses an electric motor as a drive source for driving an axle and is used for a vehicle with a driving system illustrated in FIG. 1, for example. In the description made below, an example will be described where the driving device is used for rear wheel driving. However, the driving device may be used for front wheel driving.

A vehicle 3 illustrated in FIG. 1 is a hybrid vehicle that has a driving device 6 (hereinafter referred to as front wheel driving device) in which an internal combustion engine 4 is in series connected with an electric motor 5 in a vehicle front portion. While motive power of the front wheel driving device 6 is transmitted to front wheels Wf via a transmission 7, the motive power of a driving device 1 (hereinafter referred to as rear wheel driving device) that is provided in a vehicle rear portion separately from the front wheel driving device 6 is transmitted to rear wheels Wr (RWr and LWr). The electric motor 5 of the front wheel driving device 6 and a first electric motor 2A and a second electric motor 2B of the rear wheel driving device 1 on sides of the rear wheels Wr are connected with a battery 9 and are capable of power supply from the battery 9 and of energy regeneration to the battery 9. A reference numeral 8 denotes a control device for performing various kinds of control of the whole vehicle. The control device includes an inverter as an electric power control unit that controls electric power of the electric motors 2A, 2B, and 5. The inverter converts direct current electric power into alternating current electric power between the battery 9 and the electric motors 2A, 2B, and 5 and has a function of converting the alternating current electric power into the direct current electric power.

Figure 2:
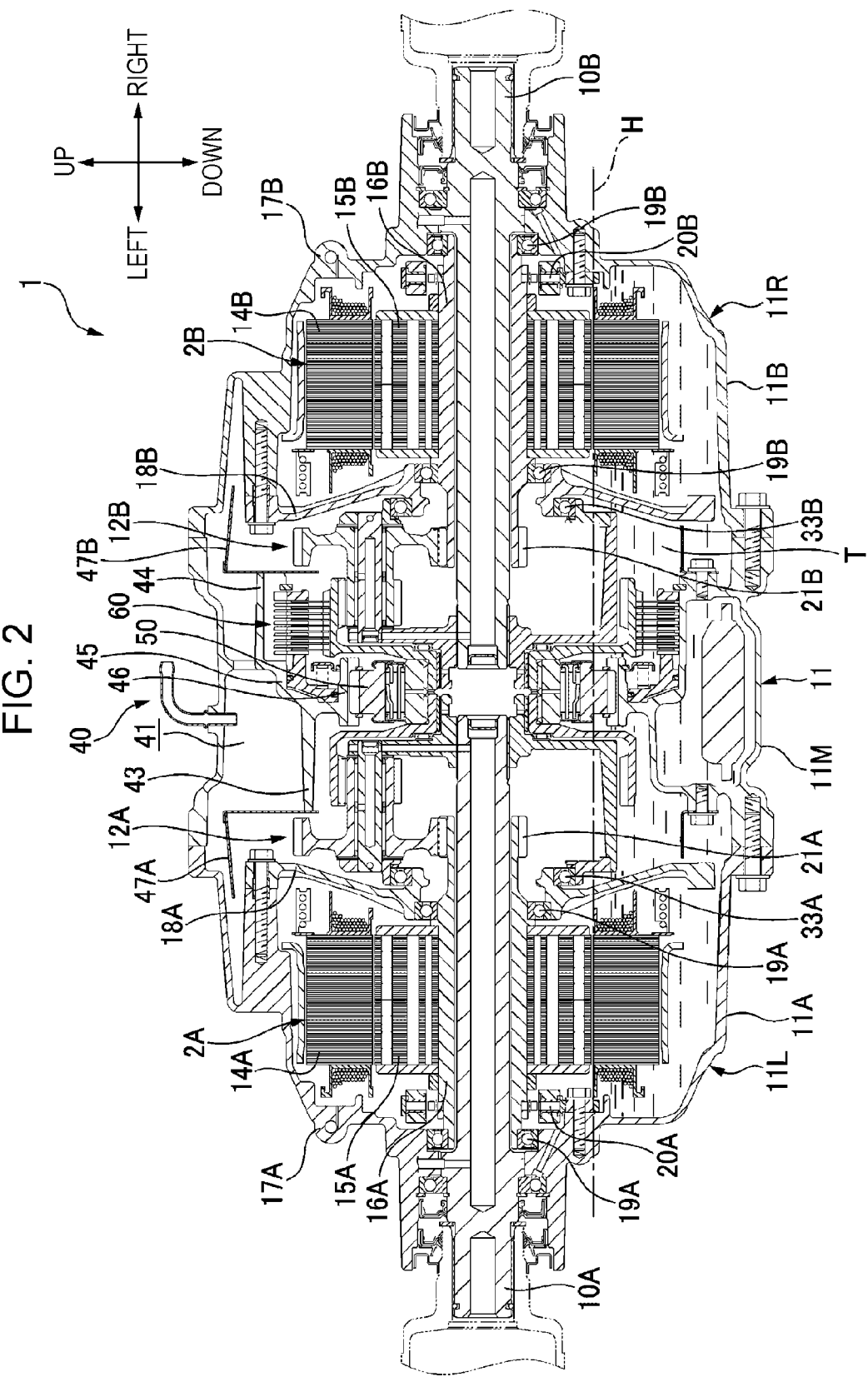
FIG. 2 is a vertical cross-sectional view of one embodiment of a rear wheel driving device.
Figure 3:
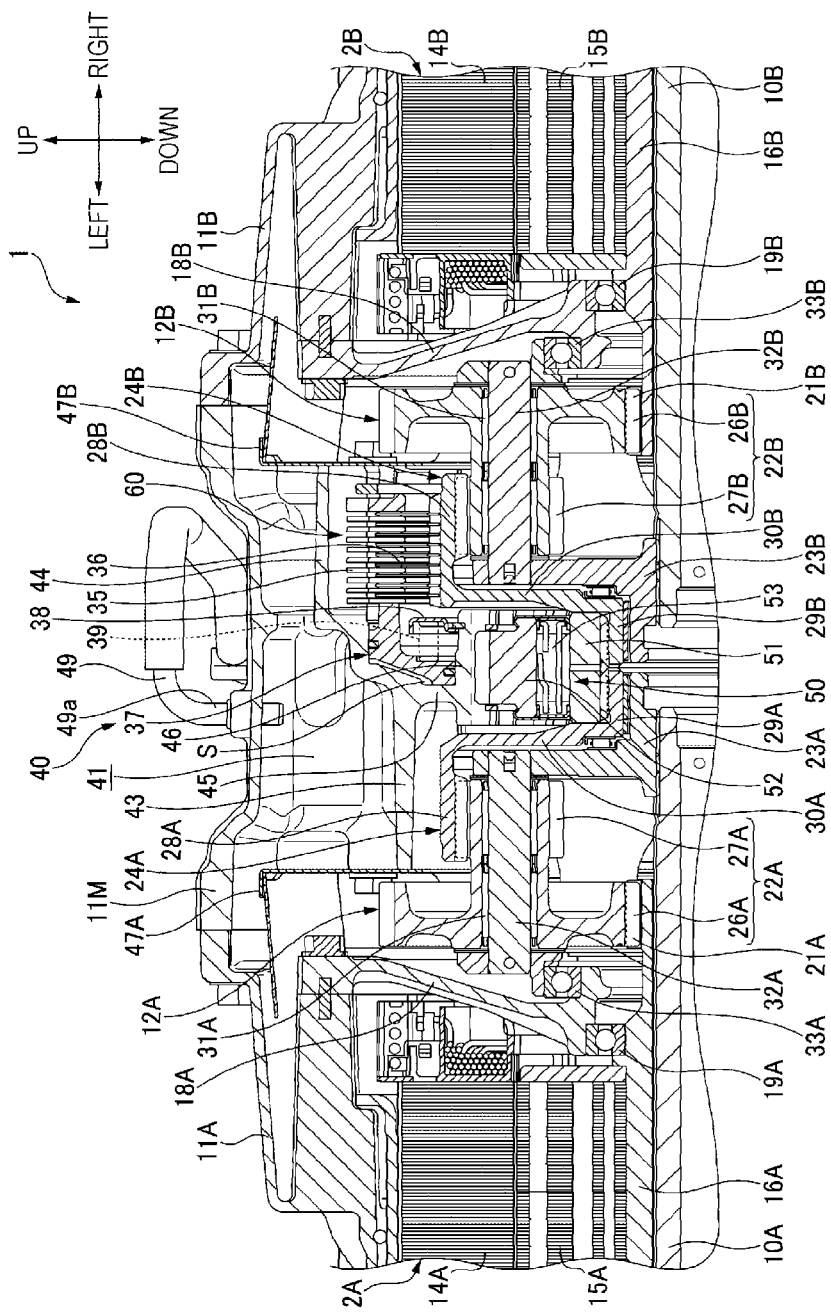
FIG. 3 is a partial enlarged view of the rear wheel driving device illustrated in FIG. 2.

FIG. 2 illustrates a vertical cross-sectional view of the whole rear wheel driving device 1. In FIG. 2, 10A and 10B denote left and right axles on the sides of the rear wheels Wr of the vehicle 3, and the axles are coaxially arranged in the vehicle width direction. A whole case 11 of the rear wheel driving device 1 is famed into a substantially cylindrical shape. In an inside of the case 11, the first electric motor 2A and the second electric motor 2B for driving the axles, a first planetary gear type reduction gear 12A and a second planetary gear type reduction gear 12B that reduce speeds of driving rotation of the first electric motor 2A and the second electric motor 2B are coaxially arranged with the axles 10A and 10B. The first electric motor 2A and the first planetary gear type reduction gear 12A function as a left wheel driving device that drives the left rear wheel LWr. The second electric motor 2B and the second planetary gear type reduction gear 12B function as a right wheel driving device that drives the right rear wheel RWr. The first electric motor 2A and the first planetary gear type reduction gear 12A and the second electric motor 2B and the second planetary gear type reduction gear 12B are arranged in left-right symmetry in the vehicle width direction in the case 11.

The rear wheel driving device 1 is provided with a breather device 40 that allows the inside of the case 11 to communicate with an outside and is configured to let out air on the inside to the outside via a breather chamber 41 such that the air on the inside does not have excessively high temperature or high pressure. The breather chamber 41 is arranged in an upper portion of the case 11 in the vertical direction and is configured with a space that is famed with an outer wall of a central case 11M, a first cylindrical wall 43 which is provided to substantially horizontally extend on a left side case 11A side in the central case 11M, a second cylindrical wall 44 that is provided to substantially horizontally extend on a right side case 11B side, a left-right division wall 45 that couples together inner end portions of the first cylindrical wall 43 and the second cylindrical wall 44, a baffle plate 47A which is attached to abut an edge portion of the first cylindrical wall 43 on the left side case 11A side, and a baffle plate 47B which is attached to abut an edge portion of the second cylindrical wall 44 on the right side case 11B side.

As for the first cylindrical wall 43 and the second cylindrical wall 44 that form a lower surface of the breather chamber 41 and the left-right division wall 45, the first cylindrical wall 43 is positioned inside in the radial direction of the second cylindrical wall 44, and the left-right division wall 45 is provided to extend from the inner end portion of the second cylindrical wall 44 to the inner end portion of the first cylindrical wall 43 while tapering and curving, is provided to extend to the further inside in the radial direction, and reaches a third cylindrical wall 46 that is provided to substantially horizontally extend. The third cylindrical wall 46 is positioned inside of both of outer end portions of the first cylindrical wall 43 and the second cylindrical wall 44 and substantially at a center of both of the outer end portions.

In the central case 11M, the baffle plates 47A and 47B are fixed to respectively demarcate a space between the first cylindrical wall 43 and the outer wall of the central case 11M and a space between the second cylindrical wall 44 and the outer wall of the central case 11M from the first planetary gear type reduction gear 12A and the second planetary gear type reduction gear 12B.

Further, in the central case 11M, an outside communication path 49 that allows the breather chamber 41 to communicate with the outside is connected with an upper surface of the breather chamber 41 in the vertical direction. A breather chamber side end portion 49a of the outside communication path 49 is arranged to be directed downward in the vertical direction. Accordingly, oil is restrained from being discharged to the outside through the outside communication path 49.

In the first electric motor 2A and the second electric motor 2B, stators 14A and 14B are respectively fixed to the side cases 11A and 11B, annular rotors 15A and 15B are rotatably arranged on inner peripheral sides of the stators 14A and 14B. Cylindrical shafts 16A and 16B that surround outer peripheries of the axles 10A and 10B are combined with inner peripheral portions of the rotors 15A and 15B. The cylindrical shafts 16A and 16B are supported by end portion walls 17A and 17B and partition walls 18A and 18B of the side cases 11A and 11B via bearings 19A and 19B so as to be capable of coaxial relative rotation with the axles 10A and 10B. Further, in the end portion walls 17A and 17B that are outer peripheries on respective one end sides of the cylindrical shafts 16A and 16B, resolvers 20A and 20B for feeding back rotational position information of the rotors 15A and 15B to controllers (not illustrated) of the first electric motor 2A and the second electric motor 2B are provided. The first electric motor 2A and the second electric motor 2B that include the stators 14A and 14B and the rotors 15A and 15B have the same radius, and the first electric motor 2A and the second electric motor 2B are arranged in a mutual mirror symmetry manner. Further, the axle 10A and the cylindrical shaft 16A pass through an inside of the first electric motor 2A and extend out of both end portions of the first electric motor 2A. The axle 10B and the cylindrical shaft 16B pass through an inside of the second electric motor 2B and extend out of both end portions of the second electric motor 2B.

Further, the first planetary gear type reduction gear 12A and the second planetary gear type reduction gear 12B include sun gears 21A and 21B, ring gears 24A and 24B, plural planetary gears 22A and 22B that mesh with the sun gears 21A and 21B and with the ring gears 24A and 24B, and planetary carriers 23A and 23B that support the planetary gears 22A and 22B. Driving forces of the first electric motor 2A and the second electric motor 2B are input from the sun gears 21A and 21B, and the driving forces whose speeds are reduced are output to the axles 10A and 10B through the planetary carriers 23A and 23B.

The sun gears 21A and 21B are integrally formed with the cylindrical shafts 16A and 16B. Further, the planetary gears 22A and 22B are double pinions that have first pinions 26A and 26B with large diameters which directly mesh with the sun gears 21A and 21B and second pinions 27A and 27B with smaller diameters than the first pinions 26A and 26B and are integrally formed in states where the first pinions 26A and 26B and the second pinions 27A and 27B are coaxial and are offset in the axial direction. The planetary gears 22A and 22B are supported by pinion shafts 32A and 32B of the planetary carriers 23A and 23B via needle bearings 31A and 31B. Inner end portions of the planetary carriers 23A and 23B in the axial direction extend to the inside in the radial direction, are spline-fitted to the axles 10A and 10B, and are supported so as to be capable of integral rotation, and the planetary carriers 23A and 23B are supported by the partition walls 18A and 18B via bearings 33A and 33B.

The ring gears 24A and 24B are configured to include gear portions 28A and 28B whose inner peripheral surfaces mesh with the second pinions 27A and 27B with the smaller diameters, small diameter portions 29A and 29B that have smaller diameters than the gear portions 28A and 28B and are arranged to be opposed to each other in an intermediate position of the case 11, and coupling portions 30A and 30B that couple inner end portions of the gear portions 28A and 28B in the axial direction and outer end portions of the small diameter portions 29A and 29B in the axial direction together in the radial direction.

The gear portions 28A and 28B are opposed to each other in the axial direction while the third cylindrical wall 46 formed in an inner diameter end portion of the left-right division wall 45 of the central case 11M is interposed. A configuration is made such that outer peripheral surfaces of the small diameter portions 29A and 29B are each spline-fitted to an inner race 51 of a one-way clutch 50, which will be described later, and the ring gears 24A and 24B are mutually coupled with the inner race 51 of the one-way clutch 50 so as to integrally rotate.

Between the second cylindrical wall 44 of the central case 11M that configures the case 11 and the gear portion 28B of the ring gear 24B on the second planetary gear type reduction gear 12B side, a hydraulic brake 60 that configures a braking unit against the ring gear 24B is arranged so as to overlap with the first pinion 26B in the radial direction and to overlap with the second pinion 27B in the axial direction. In the hydraulic brake 60, plural fixed plates 35 that are spline-fitted to an inner peripheral surface of the second cylindrical wall 44 and plural rotating plates 36 that are spline-fitted to an outer peripheral surface of the gear portion 28B of the ring gear 24B are alternately arranged in the axial direction, and those plates 35 and 36 are operated so as to be fastened or released by an annular piston 37. The piston 37 is housed in an annular cylinder chamber that is formed between the left-right division wall 45 of the central case 11M and the third cylindrical wall 46 in a reciprocable manner and is further continuously urged in the direction to release the fixed plates 35 and the rotating plates 36 by an elastic member 39 that is supported by a receiver 38 provided on an outer peripheral surface of the third cylindrical wall 46.

Further, more specifically, a working chamber S to which the oil is directly introduced is set between the left-right division wall 45 and the piston 37. In a case where the pressure of the oil introduced to the working chamber S exceeds the urging force of the elastic member 39, the piston 37 moves forward (moves rightward), and the fixed plates 35 and the rotating plates 36 are pressed to each other and fastened together. Further, in a case where the urging force of the elastic member 39 exceeds the pressure of the oil introduced to the working chamber S, the piston 37 moves backward (moves leftward), and the fixed plates 35 and the rotating plates 36 are separated and released. The hydraulic brake 60 is connected with an electric oil pump 70 (see FIG. 1).

In a case of the hydraulic brake 60, the fixed plates 35 are supported by the second cylindrical wall 44 that extends from the left-right division wall 45 of the central case 11M which configures the case 11. Meanwhile, because the rotating plates 36 are supported by the gear portion 28B of the ring gear 24B, in a case where both the fixed plates 35 and the rotating plates 36 are pressed by the piston 37, friction fastening between the fixed plates 35 and the rotating plates 36 causes a braking force to be exerted on the ring gear 24B and causes the ring gear 24B to be fixed. In a case where the fastening by the piston 37 is released from such a state, the ring gear 24B is allowed to freely rotate. As described above, because the ring gears 24A and 24B are coupled with each other, fastening of the hydraulic brake 60 causes the braking force to be exerted on the ring gear 24A and causes the ring gear 24A to be fixed, and releasing of the hydraulic brake 60 allows the ring gear 24A to freely rotate.

Further, a space portion is secured between the coupling portions 30A and 30B of the ring gears 24A and 24B that are opposed to each other in the axial direction. In the space portion, the one-way clutch 50 that transmits only motive power in one direction to the ring gears 24A and 24B and disconnects the motive power in the other direction is arranged. The one-way clutch 50 is configured such that multiple sprags 53 are interposed between the inner race 51 and an outer race 52 and the inner race 51 integrally rotates with the small diameter portions 29A and 29B of the ring gears 24A and 24B by the spline-fitting. Further, the outer race 52 is positioned by the third cylindrical wall 46 and locked so as not to rotate.

The one-way clutch 50 is configured to be engaged in a case where the vehicle 3 travels forward by the motive power of the first electric motor 2A and the second electric motor 2B and to thereby lock the rotation of ring gears 24A and 24B. Describing more specifically, the one-way clutch 50 becomes an engaged state in a case where rotational motive power in the forward direction (the rotational direction in a case of causing the vehicle 3 to travel forward) on the sides of the first electric motor 2A and the second electric motor 2B is input to the sides of the rear wheels Wr, becomes a non-engaged state in a case where the rotational motive power in a reverse direction on the sides of the first electric motor 2A and the second electric motor 2B is input to the sides of the rear wheels Wr, becomes the non-engaged state in a case where the rotational motive power in the forward direction on the sides of the rear wheels Wr is input to the sides of the first electric motor 2A and the second electric motor 2B, and becomes the engaged state in a case where the rotational motive power in the reverse direction on the sides of the rear wheels Wr is input to the sides of the first electric motor 2A and the second electric motor 2B.

As described above, in the rear wheel driving device 1 of this embodiment, the one-way clutch 50 and the hydraulic brake 60 are in parallel provided on a motive power transmission path between the first electric motor 2A and the second electric motor 2B and the rear wheels Wr. An oil accumulation unit T in which the oil is accumulated is formed in a lower portion of the case 11, an oil surface level (a reference character H in FIG. 2) is set to the extent that lower ends of the rotors 15A and 15B of the first electric motor 2A and the second electric motor 2B are not immersed in the oil, and lower portions of the fixed plates 35 and the rotating plates 36 are positioned in the oil accumulation unit T.

Here, a control device 8 (see FIG. 1) is a control device for performing various kinds of control of the whole vehicle. While a wheel speed sensor value, motor rotation speed sensor values of the first electric motor 2A and the second electric motor 2B, a steering angle, an accelerator pedal opening AP, shift positions, a state of charge (SOC) of the battery 9, an oil temperature, and so forth are input to the control device 8, signals for controlling the internal combustion engine 4, signals for controlling the first electric motor 2A and the second electric motor 2B, control signals for controlling the electric oil pump 70, and so forth are output from the control device 8.

That is, the control device 8 includes at least a function as an electric motor control device that controls the first electric motor 2A and the second electric motor 2B and a function as a connecting-disconnecting unit control device that controls a fastened state and a released state of the hydraulic brake 60 as the connecting-disconnecting unit.

FIG. 4 is a table that illustrates the relationship between the front wheel driving device 6 and the rear wheel driving device 1 in accordance with each vehicle state together with action states of the first electric motor 2A and the second electric motor 2B. In FIG. 4, a front unit represents the front wheel driving device 6, a rear unit represents the rear wheel driving device 1, rear motors represent the first electric motor 2A and the second electric motor 2B, OWC represents the one-way clutch 50, and BRK represents the hydraulic brake 60. Further, FIGS. 5 to 10 illustrate speed alignment charts in respective states of the rear wheel driving device 1. LMOT represents the first electric motor 2A, RMOT represents the second electric motor 2B, S and C on the left side respectively represent the sun gear 21A of the first planetary gear type reduction gear 12A that is coupled with the first electric motor 2A and the planetary carrier 23A of the first planetary gear type reduction gear 12A, S and C on the right side respectively represent the sun gear 21B of the second planetary gear type reduction gear 12B and the planetary carrier 23B of the second planetary gear type reduction gear 12B, R represents the ring gears 24A and 24B of the first planetary gear type reduction gear 12A and the second planetary gear type reduction gear 12B, BRK represents the hydraulic brake 60, and OWC represents the one-way clutch 50. In the description made below, the rotational direction of the sun gears 21A and 21B in a case of forward travel of the vehicle by the first electric motor 2A and the second electric motor 2B is defined as the forward direction. Further, in FIGS. 5 to 10, the portion above a state where the vehicle stands still represents the rotation in the forward direction, the portion below that state represents the rotation in the reverse direction, an upward arrow represents the torque in the forward direction, and a downward arrow represents the torque in the reverse direction.

Figure 5:
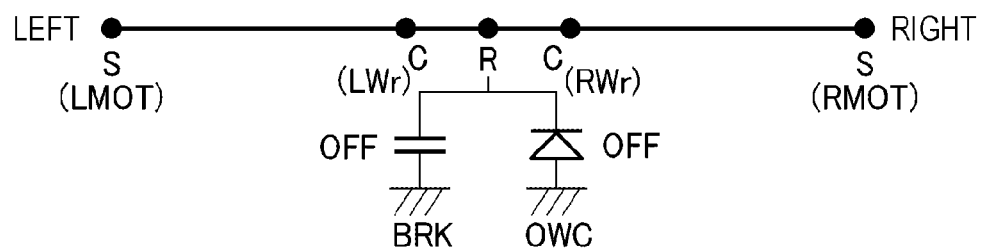
FIG. 5 is a speed alignment chart of the rear wheel driving device in a case where the vehicle stands still.

In a case where the vehicle stands still, neither the front wheel driving device 6 nor the rear wheel driving device 1 is driven. Accordingly, as illustrated in FIG. 5, because the first electric motor 2A and the second electric motor 2B of the rear wheel driving device 1 stop and the axles 10A and 10B stop, the torque is not exerted to any element. In this case, the hydraulic brake 60 is released (OFF). Further, the one-way clutch 50 is not engaged (OFF) because the first electric motor 2A and the second electric motor 2B are not driven.

Figure 6:
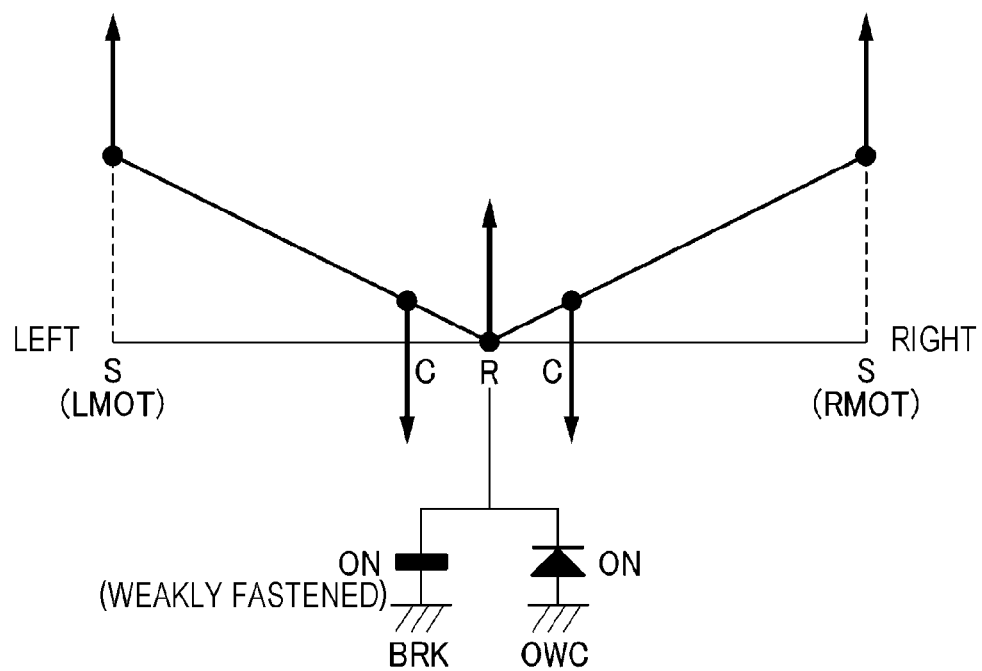
FIG. 6 is a speed alignment chart of the rear wheel driving device in a case of forward travel at a low vehicle speed.

Then, after a key position is set to ON, in a case of the forward travel at a low vehicle speed with high motor efficiency such as an EV start or EV cruising, rear wheel driving by the rear wheel driving device 1 is performed. As illustrated in FIG. 6, in a case where powering driving is performed such that the first electric motor 2A and the second electric motor 2B rotate in the forward direction, the torques in the forward direction are applied to the sun gears 21A and 21B. In this case, as described above, the one-way clutch 50 is engaged, and the ring gears 24A and 24B are locked. Accordingly, the planetary carriers 23A and 23B rotate in the forward direction, and forward travel is performed. Travel resistances from the axles 10A and 10B are exerted on the planetary carriers 23A and 23B in the reverse direction. As described above, when the vehicle 3 starts, the key position is set to ON, the torques of the first electric motor 2A and the second electric motor 2B are elevated, the one-way clutch 50 is mechanically engaged, and the ring gears 24A and 24B are thereby locked.

In this case, the hydraulic brake 60 is controlled to a weakly fastened state. The weakly fastened state is a state where motive power transmission is possible but fastening is performed by a weak fastening force compared to the fastening force of a fastened state of the hydraulic brake 60. In a case where the torques in the forward direction of the first electric motor 2A and the second electric motor 2B are input to the sides of the rear wheels Wr, the one-way clutch 50 becomes the engaged state, and the motive power transmission is possible only by the one-way clutch 50. However, the hydraulic brake 60 provided in parallel with the one-way clutch 50 is set to the weakly fastened state, and the sides of the first electric motor 2A and the second electric motor 2B and the sides of the rear wheels Wr are thereby set to a connected state. Accordingly, even in a case where the input of the torques in the forward direction from the sides of the first electric motor 2A and the second electric motor 2B is temporarily lowered and the one-way clutch 50 becomes the non-engaged state, the motive power transmission between the sides of the first electric motor 2A and the second electric motor 2B and the sides of the rear wheels Wr is restrained from being unfeasible. Further, rotation speed control for setting the sides of the first electric motor 2A and the second electric motor 2B and the sides of the rear wheel Wr to the connected state is not requested in a transition to deceleration regeneration, which will be described later. The fastening force of the hydraulic brake 60 in a case where the one-way clutch 50 is in the engaged state is made weaker than the fastening force of the hydraulic brake 60 in a case where the one-way clutch 50 is in the non-engaged state, and the energy consumption for fastening the hydraulic brake 60 is thereby reduced.

Figure 7:
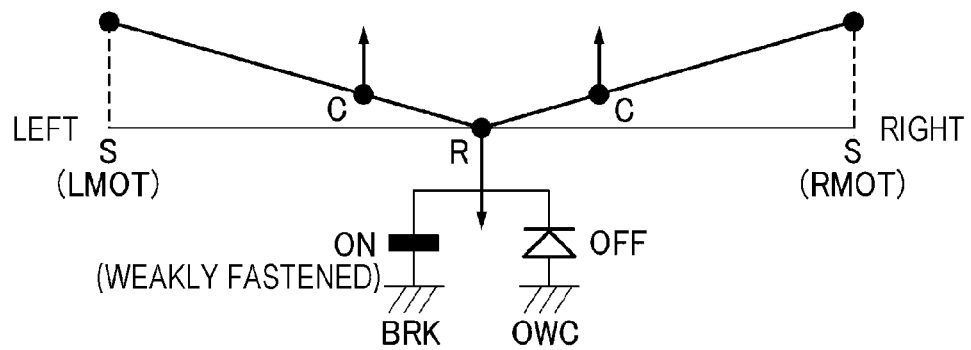
FIG. 7 is a speed alignment chart of the rear wheel driving device in a case of forward travel at an intermediate vehicle speed.

In a case where the vehicle speed increases from forward travel at a low vehicle speed and the travel reaches forward travel at an intermediate vehicle speed with high engine efficiency, switching is made from the rear wheel driving by the rear wheel driving device 1 to the front wheel driving by the front wheel driving device 6. As illustrated in FIG. 7, in a case where the powering driving of the first electric motor 2A and the second electric motor 2B is stopped, the torques in the forward direction for the forward travel are exerted from the axles 10A and 10B to the planetary carriers 23A and 23B. Thus, as described above, the one-way clutch 50 becomes the non-engaged state. In this case also, the hydraulic brake 60 is controlled to the weakly fastened state.

Figure 8:
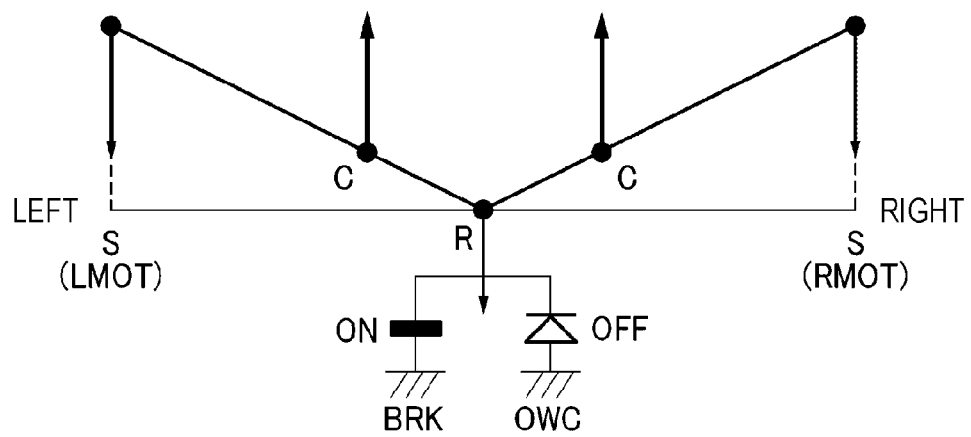
FIG. 8 is a speed alignment chart of the rear wheel driving device in a case of deceleration regeneration.

In a case where an attempt is made to perform regenerative driving by the first electric motor 2A and the second electric motor 2B from the state of FIG. 6 or 7, as illustrated in FIG. 8, the torques in the forward direction to continue the forward travel are exerted from the axles 10A and 10B to the planetary carriers 23A and 23B. Thus, as described above, the one-way clutch 50 becomes the non-engaged state. In this case, the hydraulic brake 60 is controlled to the fastened state (ON). Accordingly, the ring gears 24A and 24B are locked, regeneration braking torques in the reverse direction are exerted on the first electric motor 2A and the second electric motor 2B, and the deceleration regeneration is performed by the first electric motor 2A and the second electric motor 2B. As described above, in a case where the torques in the forward direction on the sides of the rear wheels Wr are input to the sides of the first electric motor 2A and the second electric motor 2B, the one-way clutch 50 becomes the non-engaged state, and the motive power transmission is unfeasible only by the one-way clutch 50. However, the hydraulic brake 60 provided in parallel with the one-way clutch 50 is fastened, the sides of the first electric motor 2A and the second electric motor 2B and the sides of the rear wheels Wr are set to the connected state, and a state where the motive power transmission is possible may thereby be kept. In this state, the first electric motor 2A and the second electric motor 2B are controlled to a regenerative driving state, and the energy of the vehicle 3 may thereby be regenerated.

Next, in a case of acceleration, four-wheel driving by the front wheel driving device 6 and the rear wheel driving device 1 is performed, and the rear wheel driving device 1 becomes the same state as the case of the forward travel at a low vehicle speed, which is illustrated in FIG. 6.

In a case of the forward travel at a high vehicle speed, the front wheel driving by the front wheel driving device 6 is performed. In this case, the first electric motor 2A and the second electric motor 2B are stopped, and the hydraulic brake 60 is controlled to the released state. The one-way clutch 50 becomes the non-engaged state because the torques in the forward direction on the sides of the rear wheels Wr are input to the sides of the first electric motor 2A and the second electric motor 2B, the hydraulic brake 60 is controlled to the released state, and the ring gears 24A and 24B thereby start rotating. In the case of the forward travel at a high vehicle speed, related control of the brake and the vehicle speed, which will be described below, is performed in order to maintain the fastened state of the hydraulic brake 60 as much as possible.

Figure 9:
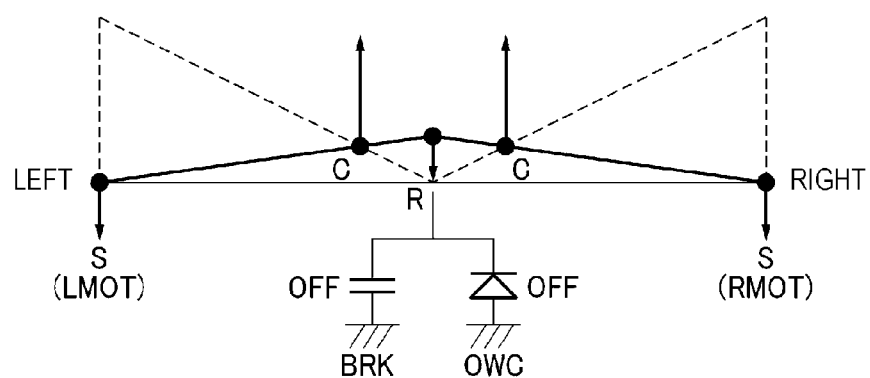
FIG. 9 is a speed alignment chart of the rear wheel driving device in a case of forward travel at a high vehicle speed.

As illustrated in FIG. 9, in a case where the first electric motor 2A and the second electric motor 2B stop the powering driving, the torques in the forward direction for the forward travel are exerted from the axles 10A and 10B to the planetary carriers 23A and 23B. Thus, as described above, the one-way clutch 50 becomes the non-engaged state. In this case, rotational loss of the sun gears 21A and 21B and the first electric motor 2A and the second electric motor 2B is input to the sun gears 21A and 21B as resistances, and the rotational loss of the ring gears 24A and 24B occur to the ring gears 24A and 24B.

The hydraulic brake 60 is controlled to the released state, and the ring gears 24A and 24B are allowed to freely rotate. The sides of the first electric motor 2A and the second electric motor 2B and the sides of the rear wheels Wr become a disconnected state, resulting in a state where the motive power transmission is unfeasible. Accordingly, the rotation of the first electric motor 2A and the second electric motor 2B is inhibited, and overspeed of the first electric motor 2A and the second electric motor 2B is inhibited in a case of a high vehicle speed by the front wheel driving device 6.

Figure 10:
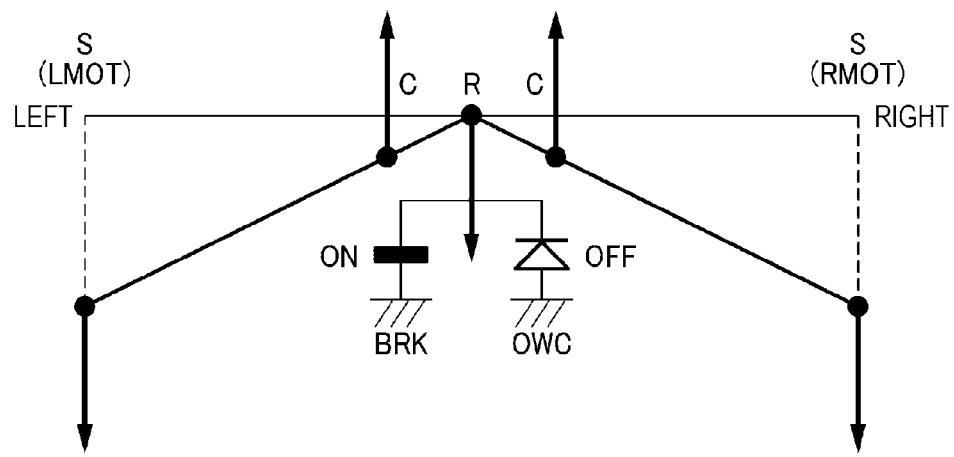
FIG. 10 is a speed alignment chart of the rear wheel driving device in a case of reverse travel.

As illustrated in FIG. 10, in a case of reverse travel and a case where reverse powering driving of the first electric motor 2A and the second electric motor 2B is performed, torques in the reverse direction are applied to the sun gears 21A and 21B. In this case, as described above, the one-way clutch 50 becomes the non-engaged state.

In this case, the hydraulic brake 60 is controlled to the fastened state. Accordingly, the ring gears 24A and 24B are locked, the planetary carriers 23A and 23B rotate in the reverse direction, and reverse travel is thereby performed. The travel resistances from the axles 10A and 10B are exerted on the planetary carriers 23A and 23B in the forward direction. As described above, in a case where the torques in the reverse direction on the sides of the first electric motor 2A and the second electric motor 2B are input to the sides of the rear wheels Wr, the one-way clutch 50 becomes the non-engaged state, and the motive power transmission is unfeasible only by the one-way clutch 50. However, the hydraulic brake 60 provided in parallel with the one-way clutch 50 is fastened, the sides of the first electric motor 2A and the second electric motor 2B and the sides of the rear wheels Wr are set to the connected state, and the motive power transmission may thereby be kept possible. The reverse travel of the vehicle 3 may be performed by the torques of the first electric motor 2A and the second electric motor 2B.

As described above, in the rear wheel driving device 1, fastening and releasing of the hydraulic brake 60 are controlled in accordance with the travel state of the vehicle, in other words, whether the rotational directions of the first electric motor 2A and the second electric motor 2B are the forward direction or the reverse direction and from which of the sides of the first electric motor 2A and the second electric motor 2B or the sides of the rear wheels Wr the motive power is input. In addition, the fastening force is adjusted even in a case where the hydraulic brake 60 is fastened.

Figure 11:
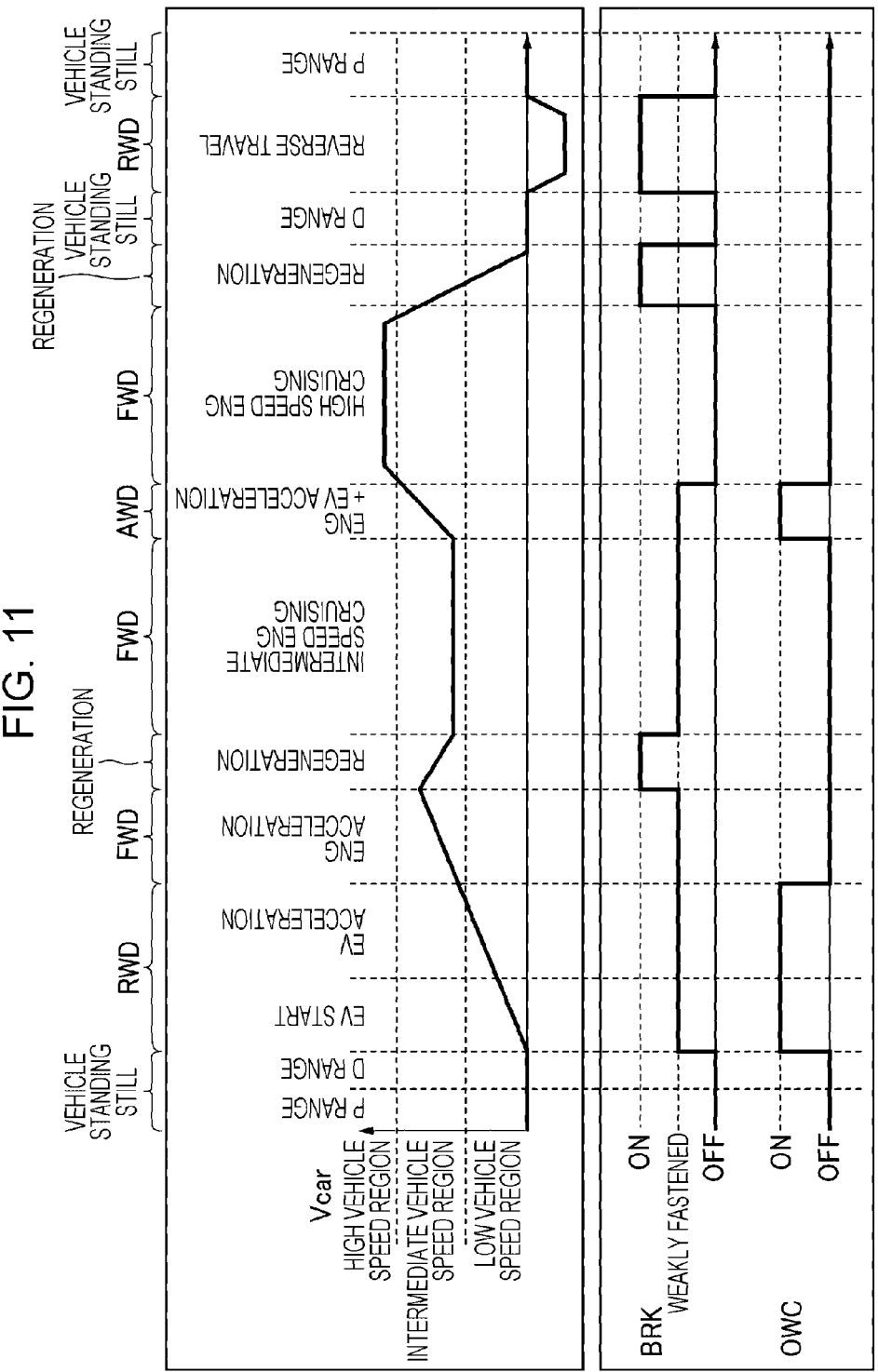
FIG. 11 is a timing diagram in one example of vehicle travel.

FIG. 11 is a timing diagram of the one-way clutch 50 (OWC) and the hydraulic brake 60 (BRK) along a sequence of EV start in a state where the vehicle stands still→EV acceleration→ENG acceleration→deceleration regeneration→inteLmediate speed ENG cruising→ENG+EV acceleration→high speed ENG cruising→deceleration regeneration→vehicle standing still→reverse travel→vehicle standing still.

First, until the key position is set to ON, the shift position is changed from a P range to a D range, and an accelerator pedal is pressed, a state where the one-way clutch 50 is non-engaged (OFF) and the hydraulic brake 60 is released (OFF) is maintained. Then, when the accelerator pedal is pressed, the EV start and the EV acceleration by the rear wheel driving (RWD) and by the rear wheel driving device 1 are performed. In this case, the one-way clutch 50 is engaged (ON), and the hydraulic brake 60 becomes the weakly fastened state. Then, when the vehicle speed reaches an inteLmediate vehicle speed region from a low vehicle speed region and switching is made from the rear wheel driving to the front wheel driving, ENG travel (FWD) by the internal combustion engine 4 is performed. In this case, the one-way clutch 50 is non-engaged (OFF), and the hydraulic brake 60 maintains the same state (the weakly fastened state). Then, in a case of the deceleration regeneration such as a case where the brake is pressed, the hydraulic brake 60 becomes the fastened state (ON) while the one-way clutch 50 is non-engaged (OFF). During the intermediate speed cruising by the internal combustion engine 4, the vehicle becomes a similar state to the above-described ENG travel. Next, in a case where the accelerator pedal is further pressed and switching is made from the front wheel driving to the four-wheel driving (AWD), the one-way clutch 50 is again engaged (ON). Then, when the vehicle speed reaches a high vehicle speed region from the intermediate vehicle speed region, the ENG travel (FWD) by the internal combustion engine 4 is again performed. In this case, the one-way clutch 50 is non-engaged (OFF), the hydraulic brake 60 becomes the released state (OFF), and the first electric motor 2A and the second electric motor 2B are stopped. Then, in the case of the deceleration regeneration, the vehicle becomes a similar state to the above-described case of the deceleration regeneration. Then, when the vehicle stops, the one-way clutch 50 is non-engaged (OFF), and the hydraulic brake 60 becomes the released (OFF) state.

Here, the characteristics of the hydraulic brake 60 will be described.

The hydraulic brake 60 is a so-called wet multi-plate type brake. As described above, the plural fixed plates 35 and the plural rotating plates 36 are alternately arranged in the axial direction, and those plates 35 and 36 are operated so as to be fastened or released by the annular piston 37. The wet multi-plate type brake cools both the fixed plates 35 and the rotating plates 36 by the oil as cooling oil. Because the oil serves as a damper, a shock in fastening is mild compared to a dry type clutch.

The lower portions of the rotating plates 36 that are spline-fitted to the outer peripheral surface of the gear portion 28B of the ring gear 24B are positioned in the oil accumulation unit T in the lower portion of the case 11. Because the rotating plates 36 stir the oil in the oil accumulation unit T in response to the rotation of the ring gears 24A and 24B, a mixing resistance force of the oil is exerted on the rotating plates 36. The mixing resistance force due to the oil changes in accordance with the oil viscosity. Further, it is known that there is an inverse correlation between the oil viscosity and the temperature (oil temperature). The viscosity becomes lower as the oil temperature becomes higher, and the viscosity becomes higher as the oil temperature becomes lower. Accordingly, an oil viscosity acquisition unit that acquires the oil viscosity may be a degree-of-viscosity sensor that directly detects or estimates the oil viscosity or may be a temperature sensor that detects the oil temperature in the inverse correlation with the oil viscosity. The control device 8 may acquire (detect, calculate, or estimate) the oil viscosity from those sensor values.

The oil viscosity is high at a low temperature (0° C. or lower, for example). In a case where the vehicle speed increases, even if the hydraulic brake 60 is released, the torques are transmitted to the rear wheels Wr via the oil, and the behavior of the vehicle 3 may become unstable.

Further, in a case where the hydraulic brake 60 is kept fastened in a state where the vehicle speed is high, the rotational speeds of the first electric motor 2A and the second electric motor 2B increase together with the vehicle speed, and an overvoltage that exceeds a withstand voltage of the inverter may be exerted.

Thus, the control device 8 has a function as a vehicle speed control device that controls the speed of the vehicle 3 in addition to the above-described functions as the electric motor control device and the connecting-disconnecting unit control device and performs the related control of the brake and the vehicle speed in which the hydraulic brake 60 is released or fastened and the vehicle speed is restricted in accordance with the oil viscosity in the case of the forward travel at a high vehicle speed.

Related Control of Brake and Vehicle Speed

First Embodiment

Figure 12:
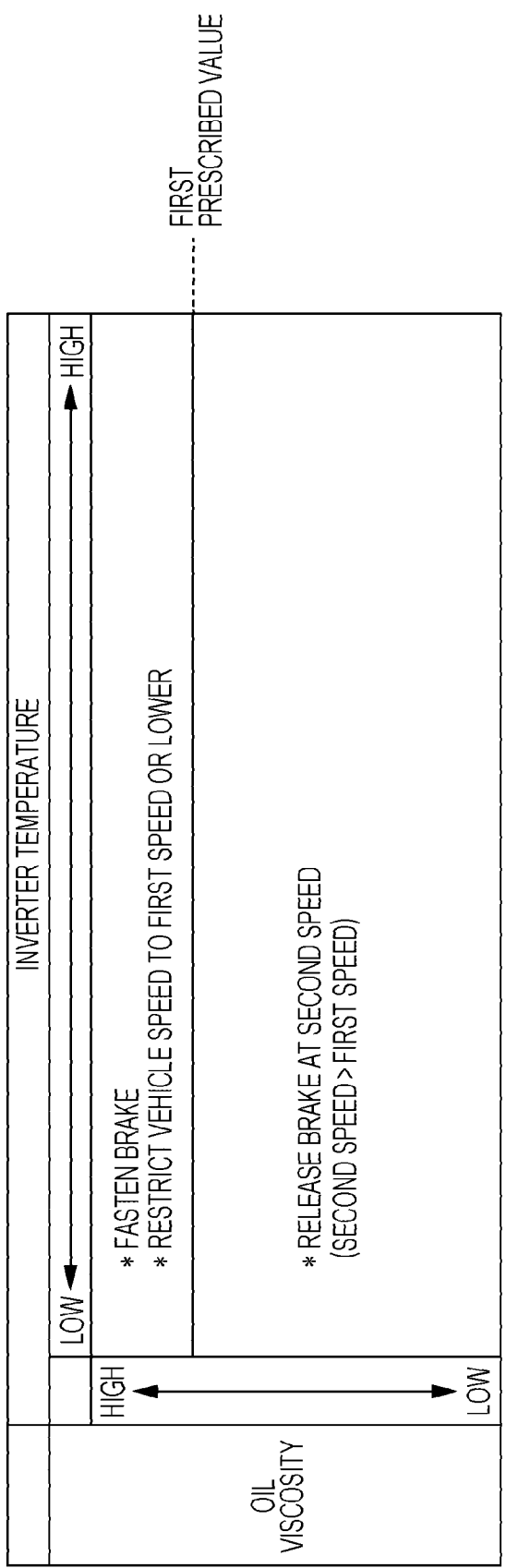
FIG. 12 is a graph that explains related control of a brake and a vehicle speed in a first embodiment.

In a first embodiment of the related control of the brake and the vehicle speed, as illustrated in FIG. 12, the control device 8 fastens the hydraulic brake 60 or maintains fastening thereof and controls the speed of the vehicle 3 to lower than a first speed in a case where the viscosity is a first predetermined value or higher. That is, even in a case where the hydraulic brake 60 is released in a state where the mixing resistance force of the oil is large, unnecessary torques are transmitted to the rear wheels Wr, and the behavior of the vehicle 3 may thereby become unstable. However, in a case where the viscosity is high, the vehicle speed is restricted while the hydraulic brake 60 is kept fastened, and instability of vehicle behavior may thereby be inhibited.

Further, in a case where the viscosity is lower than the first predetermined value, the control device 8 releases the hydraulic brake 60 when the speed of the vehicle 3 is a second speed or higher that is higher than the first speed. Accordingly, in a case where the viscosity is lower than the first predetermined value, the hydraulic brake 60 may be kept fastened until the vehicle 3 reaches the second speed. In addition, the hydraulic brake 60 is released in a case where the speed of the vehicle 3 is the second speed or higher, and the overspeed of the first electric motor 2A and the second electric motor 2B may thereby be inhibited.

Second Embodiment

Figure 13:
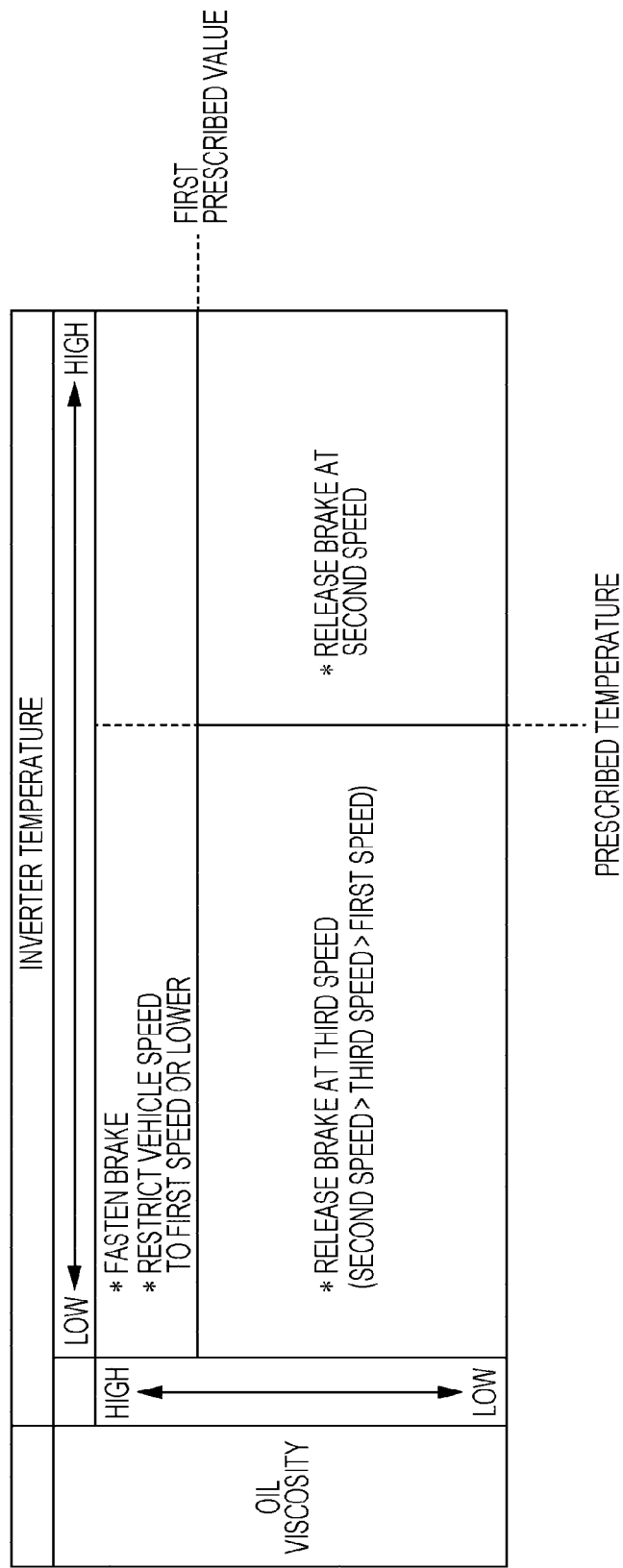
FIG. 13 is a graph that explains the related control of the brake and the vehicle speed in a second embodiment.

In a second embodiment of the related control of the brake and the vehicle speed, as illustrated in FIG. 13, in addition to the control of the first embodiment in FIG. 12, the vehicle speed is further restricted based on the temperature of the inverter. Specifically, in a case where the viscosity is lower than the first predetermined value and the inverter temperature is lower than a predetermined temperature, the control device 8 releases the hydraulic brake 60 at a third speed or higher that is higher than the first speed and lower than the second speed. Accordingly, while the inverter is protected, the hydraulic brake 60 may be kept fastened to the third speed.

The temperature of the inverter may be acquired by a temperature sensor as a temperature acquisition unit that acquires the temperature of the inverter. However, the temperature acquisition unit is not limited to a case of directly acquiring the temperature of the inverter but may be a temperature sensor that acquires a cooling water temperature of the inverter. The control device 8 may acquire (detect, calculate, or estimate) the temperature of the inverter from those sensor values.

Third Embodiment

Figure 14:
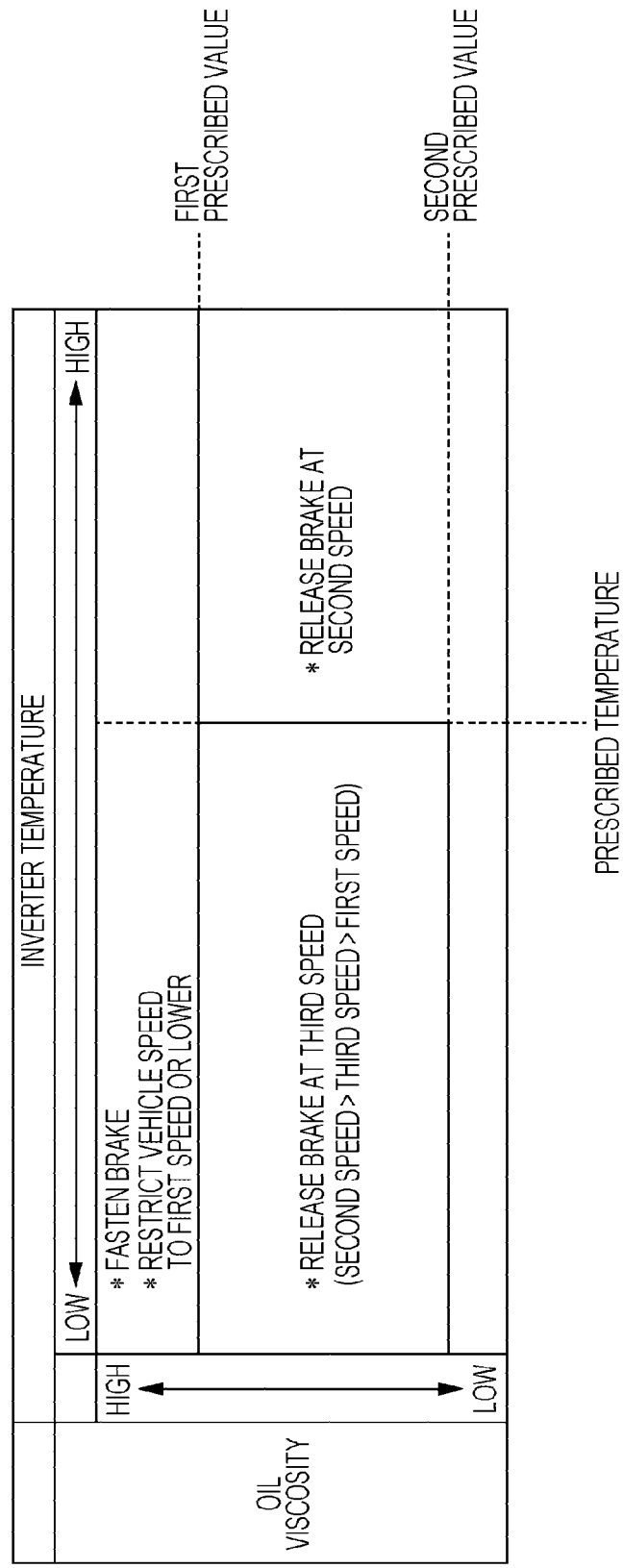
FIG. 14 is a graph that explains the related control of the brake and the vehicle speed in a third embodiment.

In a third embodiment of the related control of the brake and the vehicle speed, as illustrated in FIG. 14, in addition to the control of the second embodiment in FIG. 13, the vehicle speed is further restricted based on the degree of viscosity of the oil. Specifically, in a case where the viscosity is lower than the first predetermined value and equal to or higher than a second predetermined value that is higher than the first predetermined value and the inverter temperature is lower than the predetermined temperature, the control device 8 releases the hydraulic brake 60 at the third speed or higher. Accordingly, in a region in which the viscosity is lower than the second predetermined value, the hydraulic brake 60 may be kept fastened to the second speed that exceeds the third speed.

Fourth Embodiment

Figure 15:
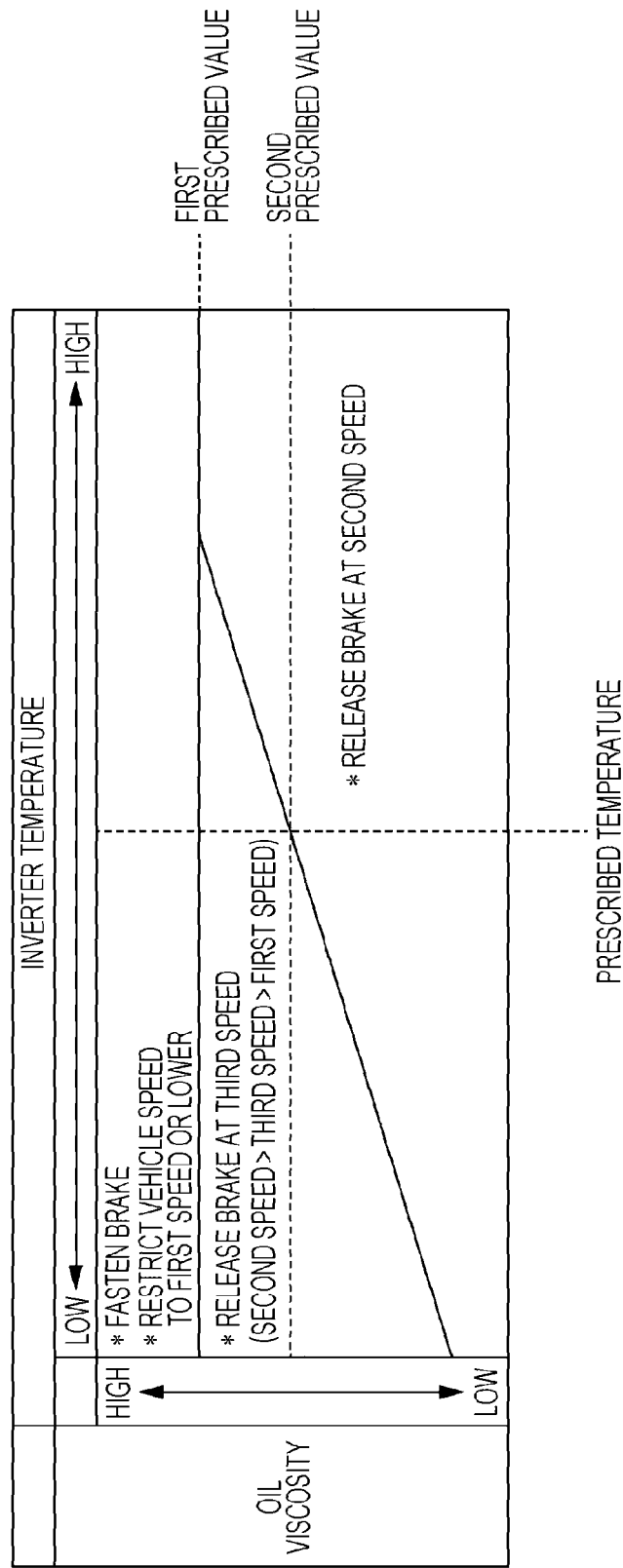
FIG. 15 is a graph that explains the related control of the brake and the vehicle speed in a fourth embodiment.

In a fourth embodiment of the related control of the brake and the vehicle speed, as illustrated in FIG. 15, in the control of the third embodiment in FIG. 14, the predetermined temperature and the second predetermined value are variation values and are set such that the second predetermined value becomes higher as the predetermined temperature becomes higher. Accordingly, the region in which the hydraulic brake 60 may be kept fastened to the second speed that exceeds the third speed may be expanded. Further, differently from the predetermined temperature and the second predetermined value, the first predetermined value is set as a fixed value, and an influence on the vehicle behavior may thereby be suppressed certainly.

Figure 16:
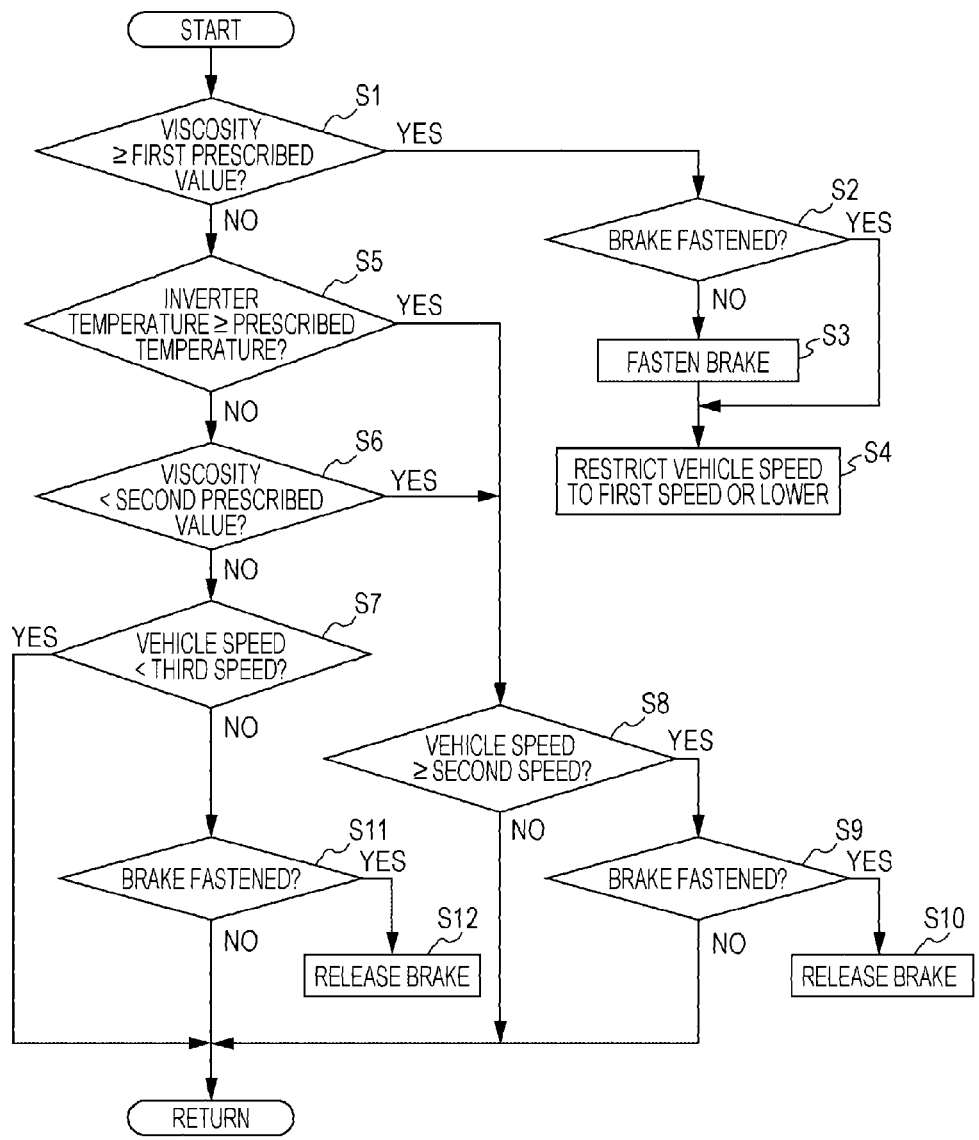
FIG. 16 is a flowchart that explains the related control of the brake and the vehicle speed.

Next, a control flow of the related control of the brake and the vehicle speed will be described with reference to FIG. 16. The control flow of FIG. 16 illustrates a control flow in the third embodiment and the fourth embodiment, which are illustrated in FIG. 14 and FIG. 15.

First, in step S1, a determination is made whether or not the viscosity is the first predetermined value or higher. As a result, in a case where the viscosity is the first predetermined value or higher, in step S2, a determination is made whether or not the hydraulic brake 60 is fastened. In a case where the hydraulic brake 60 is fastened, the vehicle speed is restricted to the first vehicle speed or lower while the hydraulic brake 60 is kept fastened (step S4). In a case where the hydraulic brake 60 is not fastened, the hydraulic brake 60 is fastened (step S3), and the vehicle speed is restricted to the first vehicle speed or lower (step S4).

In step S1, in a case where the viscosity is not the first predetermined value or higher, that is, the viscosity is lower than the first predetermined value, in step S5, a determination is made whether or not the inverter temperature is the predetermined temperature or higher. In a case where the inverter temperature is not the predetermined temperature or higher, that is, the inverter temperature is lower than the predetermined temperature, in step S6, a determination is next made whether or not the viscosity is lower than the second predetermined value.

In a case where the inverter temperature is the predetermined temperature or higher in step S5 and where the viscosity is lower than the second predetermined value in step S6, in step S8, a determination is made whether or not the vehicle speed is the second speed or higher. As a result, in a case where the vehicle speed is the second speed or higher, in step S9, a determination is made whether or not the hydraulic brake 60 is fastened. In a case where the hydraulic brake 60 is fastened, the hydraulic brake 60 is released (step S10). In a case where the hydraulic brake 60 is not fastened, release of the hydraulic brake 60 is maintained.

In step S8, in a case where the vehicle speed is not the second speed or higher, that is, the vehicle speed is lower than the second speed, the process is finished without assigning a particular restriction.

In step S6, in a case where the viscosity is not lower than the second predetermined value, that is, the viscosity is the second predetermined value or higher, in step S7, a determination is made whether or not the vehicle speed is lower than the third speed. As a result, in a case where the vehicle speed is lower than the third speed, the process is finished without assigning a particular restriction. On the other hand, in a case where the vehicle speed is not lower than the third speed, that is, the vehicle speed is the third speed or higher, in step S11, a determination is made whether or not the hydraulic brake 60 is fastened. In a case where the hydraulic brake 60 is fastened, the hydraulic brake 60 is released (step S12). In a case where the hydraulic brake 60 is not fastened, release of the hydraulic brake 60 is maintained.

The present disclosure is not limited to the above-described embodiments, but appropriate modifications, improvements, and so forth are possible.

For example, the wet multi-plate type hydraulic brake is exemplified as the connecting-disconnecting unit. However, the connecting-disconnecting unit may be a wet multi-plate type clutch.

Further, as long as the drive source and the wheel are connected together via the connecting-disconnecting unit, the transmission apparatus is not necessarily requested. In a case where the drive source and the wheel are connected together via the transmission apparatus, the transmission apparatus may appropriately be selected.

What is claimed is:

1. A driving device comprising:
   a drive source configured to generate a driving force of a vehicle;
   a wet multi-plate type connecting-disconnecting unit provided on a motive power transmission path between the drive source and a wheel of the vehicle and configured to cause a side of the drive source and a side of the wheel to become a disconnected state or a connected state by being released or fastened;
   a connecting-disconnecting unit control device configured to control switching between the disconnected state and the connected state of the connecting-disconnecting unit;
   a vehicle speed control device configured to control a speed of the vehicle; and
   a viscosity acquisition unit configured to acquire a viscosity correlation amount of a liquid fluid which is provided to cool a multi-plate portion of the wet multi-plate type connecting-disconnecting unit, wherein
   in a case where the viscosity correlation amount is a first predetermined value or higher, the connecting-disconnecting unit control device fastens the connecting-disconnecting unit, thereby causing the side of the drive source and the side of the wheel to become the connected state, or maintains said fastening of the connecting-disconnecting unit, and the vehicle speed control device controls the speed of the vehicle to be lower than a first predetermined speed.

2. The driving device according to claim 1,
   wherein in a case where the viscosity correlation amount is lower than the first predetermined value, the connecting-disconnecting unit control device releases the connecting-disconnecting unit in a case where the speed of the vehicle is a second predetermined speed or higher that is higher than the first predetermined speed.

3. The driving device according to claim 2,
   wherein the drive source is an electric motor,
   the driving device further comprises an electric power controller that controls electric power of the electric motor and a temperature acquisition unit that acquires a temperature of the electric power controller, and
   in a case where the viscosity correlation amount is lower than the first predetermined value and the temperature is lower than a predetermined temperature, the vehicle speed control device releases the connecting-disconnecting unit at a third predetermined speed or higher that is higher than the first predetermined speed and lower than the second predetermined speed.

4. The driving device according to claim 3,
   wherein in a case where the viscosity correlation amount is lower than the first prescribed value and equal to or higher than a second predetermined value that is lower than the first predetermined value and the temperature is lower than the predetermined temperature, the vehicle speed control device releases the connecting-disconnecting unit at the third predetermined speed or higher.

5. The driving device according to claim 4,
wherein the first predetermined value is a fixed value, and
the predetermined temperature and the second predetermined value are variation values and are set such that the second predetermined value becomes higher as the predetermined temperature becomes higher.

* * * * *